(12) United States Patent
Kim et al.

(10) Patent No.: US 7,232,784 B2
(45) Date of Patent: Jun. 19, 2007

(54) METAL OXIDE-CONTAINING KENYAITE CATALYST, METHOD FOR PREPARING THE SAME, AND METHOD FOR PREPARING ε-CAPROLACTAM USING THE SAME

(75) Inventors: Sun-Jin Kim, Seoul (KR); Oh-Shim Joo, Seoul (KR); Kwang-Deog Jung, Seoul (KR); Min-Jo Park, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 196 days.

(21) Appl. No.: 11/022,250

(22) Filed: Dec. 23, 2004

(65) Prior Publication Data

US 2006/0047113 A1    Mar. 2, 2006

(30) Foreign Application Priority Data

Aug. 24, 2004   (KR) .................. 10-2004-0066877

(51) Int. Cl.
*B01J 23/00* (2006.01)
*C07D 201/04* (2006.01)

(52) U.S. Cl. ...................................... 502/100; 540/536

(58) Field of Classification Search ................ 540/536; 502/100

See application file for complete search history.

(56) References Cited

U.S. PATENT DOCUMENTS 6,703,501 B1 *   3/2004   Kim et al. .................. 540/536

FOREIGN PATENT DOCUMENTS

KR    1020010028430 A    4/2001

OTHER PUBLICATIONS

Anand, R., et al., "Vapor phase Beckmann rearrangement of cyclohexanone oxime over different ferrierite zeolite catalysts", Catalysis Letters, Mar. 2002, vol. 78, Nos. 1-4, pp. 189-194.
Korean Office Action for Application No. 10-2004-0066877, dated Jan. 25, 2006 (English translation).

* cited by examiner

Primary Examiner—Bruck Kifle
(74) Attorney, Agent, or Firm—Darby & Darby

(57) ABSTRACT

Disclosed are a kenyaite catalyst containing a metal oxide between layers of a layered silicate having kenyaite structure, a method for preparing the same, and a method for preparing ε-caprolactam from cyclohexanone oxime by applying the catalyst to gas phase Beckmann rearrangement.

9 Claims, 1 Drawing Sheet

METAL OXIDE-CONTAINING KENYAITE CATALYST, METHOD FOR PREPARING THE SAME, AND METHOD FOR PREPARING ε-CAPROLACTAM USING THE SAME

BACKGROUND OF THE INVENTION

1. Field of the Invention

The present invention relates to a metal oxide-containing kenyaite catalyst, a method for preparing the same, and a method for preparing ε-caprolactam from cyclohexanone oxime by applying the catalyst to gas phase Beckmann rearrangement of cyclohexanone oxime.

2. Description of the Background Art

A process for preparing ε-caprolactam from cyclohexanone oxime is one of the industrially important processes. ε-Caprolactam is a raw material for preparing nylon-6. A general commercial production process for preparing ε-caprolactam is carried out by the Beckmann rearrangement of cyclohexanone oxime in a liquid phase by using a sulfuric acid as a catalyst.

However, several problems are caused from using the sulfuric acid as a catalyst in the process for preparing ε-caprolactam. For example, after the Beckmann rearrangement, a large amount of ammonia must be used as a neutralizer for removing the sulfuric acid used as the catalyst, and thereby ammonium sulfate, which is economically disadvantageous, is produced as by-products in the amount of 2 to 3 tons per a ton of ε-caprolactam. Since a great cost is incurred in collecting and processing the by-product, the production of such by-product makes the unit cost of production of ε-caprolactam increased. In addition, since sulfuric acid used as a catalyst is a very strong acid, several problems are generated. For example, sulfuric acid makes a reaction vessel corroded and is difficult to be handled, to cause many problems in safety and environment.

In order to solve the foregoing problems of the conventional process for preparing ε-caprolactam by using sulfuric acid as the catalyst, a process for performing Beckmann rearrangement of cyclohexanone oxime in a gas phase by replacing sulfuric acid with a solid acid has been developed and actively investigated. For example, silica-alumina, solid phosphoric acid, boric acid, a metal oxide and zeolite have been suggested as the solid acid catalysts for the gas phase Beckmann rearrangement of cyclohexanone oxime.

Nevertheless, the researches on the solid acid catalysts do not show satisfactory results in the lifetime of catalysts, the conversion of cyclohexanone oxime and the selectivity of ε-caprolactam. Therefore, It is necessary to develop a solid acid catalyst having excellent catalytic performance in the gas phase Beckmann rearrangement of cyclohexanone oxime.

In order to develop the solid acid catalyst having excellent catalytic performance in the gas phase Beckmann rearrangement of cyclohexanone oxime, the Beckmann rearrangement using various kinds of zeolite catalysts different in pore size and shape has been attempted. In addition, so as to improve performance of the zeolite catalyst, there have been suggested various methods, for example, controlling acid strength and concentration by changing Si/Al mol ratio, substituting with a different metal in the framework of zeolite, controlling a particle size and an external surface area of zeolite, and modifying a catalyst active site by treating zeolite with an acid or base. However, such methods have not obtained advantageous results in conversion of cyclohexanone oxime, yield of ε-caprolactam and catalytic durability.

On the other hand, in accordance with various research results on the solid acid catalysts in the gas phase Beckmann rearrangement of cyclohexanone oxime, in order to obtain excellent catalytic performance in the gas phase Beckmann rearrangement of cyclohexanone oxime, it is advantageous that the solid acid catalyst has a relatively weak acid site or a medium acid site. When the solid acid catalyst has a strong acid site, side reactions increase (Catalysis Letter, vol 78, p. 189, 2002).

The present inventors have made researches to develop a sold acid catalyst for the gas phase Beckmann rearrangement of cyclohexanone oxime, and finally found out the fact that the conversion of cyclohexanone oxime and the yield of ε-caprolactam could be improved in the gas phase Beckmann rearrangement of cyclohexanone oxime using a solid acid catalyst being prepared by introducing a metal oxide to a layered silicate having a kenyaite structure synthesized in the presence of an amine template and has a weak or medium acid site, to complete the present invention.

SUMMARY OF THE INVENTION

Therefore, an object of the present invention is to provide a metal oxide containing kenyaite catalyst which improves the conversion of cyclohexanone oxime and the yield of ε-caprolactam in gas phase Beckmann rearrangement of cyclohexanone oxime, and which is safe, economical, pro-environmental and extended in lifetime, a method for preparing the same, and a method for preparing ε-caprolactam from cyclohexanone oxime by using the catalyst.

To achieve these and other advantages and in accordance with the purpose of the present invention, as embodied and broadly described herein, there are provided a metal oxide containing kenyaite catalyst, a method for preparing the same, and a method for preparing ε-caprolactam from cyclohexanone oxime by applying the catalyst to gas phase Beckmann rearrangement of cyclohexanone oxime.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Figure 1:
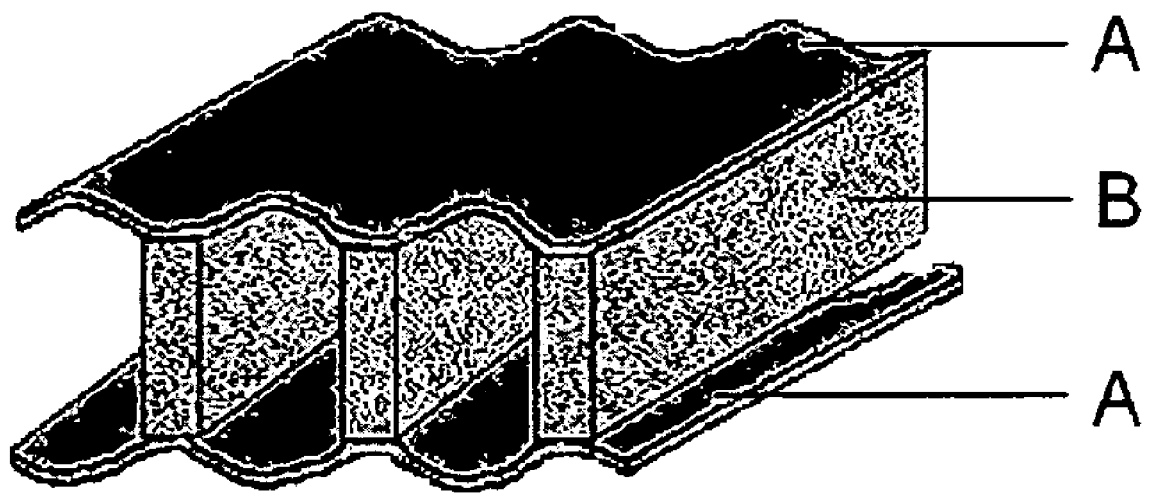
FIG. 1 shows that a metal oxide introduced and pillared between layers of a layered-silicate (A: silica layer, B: metal oxide introduced between the layers).

Reference will now be made in detail to the preferred embodiments of the present invention, examples of which are illustrated in the accompanying drawings.

First, the present invention provides a kenyaite catalyst prepared by introducing a metal oxide between layers of a layered silicate having kenyaite structure. In accordance with the present invention, the kenyaite catalyst containing a metal oxide improves thermo-resistance, has a large surface area and pore structure, and also has a weak or medium acid site, due to the metal oxide applied between the layers, thereby showing excellent catalytic performance in gas phase Beckmann rearrangement of cyclohexanone oxime.

FIG. 1 shows a structure wherein a metal oxide introduced between layers of a layered silicate. As known from FIG. 1, in the present invention, the metal oxide is introduced and pillared between the layers of the layered-silicate, and thereby the kenyaite catalyst has a large surface area, high porosity, and a thermally stable structure. Preferably, the Brunauer-Emmett-Teller (BET) surface area of the metal oxide-containing kenyaite catalyst ranges from 100 to 300 $m^2/g$. In the case that the BET surface area of the metal oxide-containing kenyaite catalyst ranges from 150 to 250 $m^2/g$, the catalyst shows more excellent catalytic activity.

The layered silicate having a kenyaite structure, which contains an amine template, may be prepared by using $SiO_2$, $Na_2O$, $H_2O$, boric acid and organic amine. For example, the amine template may be hexamethyleneimine, and contained at an amount of about 0.5 to 1.5 mol in 2.0 mol of $SiO_2$. If the content of hexamethyleneimine is out of the range, the kenyaite structure cannot be formed.

Preferably, the metal oxide is selected from the group consisting of niobium oxide ($Nb_2O_5$), tantalum oxide ($Ta_2O_5$), molybdenum oxide ($Mo_2O_3$, $MoO_3$), and tungsten oxide ($WO_3$). Preferably, the content of the metal oxide ranges from 1 to 15 wt % of the total catalyst weight when calculated on the basis of the metal weight of the metal oxide, and more preferably, from 3 to 12 wt %. If the content of the metal oxide is out of the range, catalytic efficiency is lowered.

In addition, the present invention provides a method for preparing a metal oxide-containing kenyaite catalyst, comprising the steps of synthesizing a layered silicate having a kenyaite structure containing an amine template using a amine template, swelling the synthesized layered silicate to facilitate an introduction of a material between the layers thereof, and adding an organic metal compound to the swollen layered silicate, to introduce the metal oxide between the layer of the layered silicate.

The layered silicate of kenyaite structure containing the amine template used as a raw material in the present invention is preferably prepared by using silica sol ($SiO_2$), sodium oxide ($Na_2O$), boric acid ($H_3BO_3$) and $H_2O$ in the presence of the amine template. Since the method for preparing the catalyst uses the layered silicate having kenyaite structure, which mainly contains an organic amine instead of an inorganic cation ($Na^+$, $K^+$, etc.) as a template, the method does not require a separate process for removing such inorganic cation in preparation of the catalyst, to make the whole preparation process simplified and economical.

More specifically, the layered silicate having kenyaite structure containing an amine template may be prepared by adding 0.01 to 0.3 mol of boric acid ($H_3BO_3$) to the mixture of the amine template, $SiO_2$, $Na_2O$ and $H_2O$ on the basis of 2 mol of $SiO_2$. More specifically, the layered silicate having kenyaite structure containing an amine template can be prepared by using hexamethyleneimine: $Na_2O$, $H_3BO_3$, $SiO_2$ and $H_2O$ in a mol ratio of 1.0:0.27:0.01 to 0.3:2.0:90 (hexamethyleneimine:$Na_2O$:$H_3BO_3$:$SiO_2$:$H_2O$) to form a gel, and heating the gel at 150° C. for 5 to 15 days. The pure kenyaite structure containing an amine template can be easily obtained by adding the boric acid to the above gel. As mentioned above, the addition amount of the boric acid preferably ranges from 0.01 to 0.3 mol, and more preferably, from 0.05 to 0.2 mol, on the basis of 2 mol of $SiO_2$. If the amount of the boric acid does not reach the range, synergy effects on the formation of the kenyaite structure do not occur, and if the amount of the boric acid exceeds the range, it takes a long time to form the kenyaite structure.

The prepared layered silicate having kenyaite structure containing an amine template may be swollen by using an amine having a long carbon chain as a swelling agent, and thereby, the spacing between the layers of the layered silicate having kenyaite structure is expanded, so that the metal compound can be easily introduced between the layers. Examples of the amines used as the swelling agent include amines having 6 to 16 carbon atoms, such as hexylamine and octylamine. In an embodiment of the present invention, a suspension of kenyaite is prepared by mixing the layered silicate having kenyaite structure containing an amine template with a mixed solution of one selected from amines having 6 to 16 carbon atoms [e.g., CTMACl (cetyltrimethylammonium chloride)] and TPAOH (tetrapropylammonium hydroxide), heated at a room temperature to 150° C. for 2 to 4 days, washed with distilled water, and dried, to obtain the swollen layered silicate having kenyaite structure containing an amine template. Preferably, the mixing mole ratio of CTMACl and TPAOH is 1:1 to 1.5:1.

The layered silicate having kenyaite structure containing the metal oxide between the layers can be prepared by adding an organic metal compound to the swollen layered silicate having kenyaite structure, and calcining the layered silicate having kenyaite structure at a high temperature. For example, a metal oxide selected from the group consisting of $Nb_2O_5$, $Ta_2O_5$, $Mo_2O_3$, $MoO_3$ and $WO_3$ can be introduced between the layers of the layered silicate having kenyaite structure, by adding an organic metal compound selected from the group consisting of $Nb(C_2H_5O)_5$, $Ta(C_2H_5O)_5$, $Ta[O(CH_2)_3CH_3]_5$, $[(CH_3CO_2)_2Mo]_2$, $Mo(CO)_6$ and $W(CO)_6$ to the swollen layered silicate having kenyaite structure. Preferably, the amount of the metal oxide ranges from 1 to 15 wt % of the total catalyst weight on the basis of the metal weight of the metal oxide, and more preferably, from 3 to 12 wt %. If the amount of the metal oxide does not reach 1 wt % or exceeds 15 wt %, catalytic efficiency is reduced.

The calcination process may be preferably performed at 500 to 900° C. in the air. If the calcination temperature is lower than 500° C., the amine existing between the kenyaite layers is not completely removed, and if the calcination temperature is higher than 900° C., the metal oxide containing kenyaite structure is partially destroyed.

In an embodiment of the present invention, the metal oxide may be introduced into the layered silicate having kenyaite structure containing an amine template through the following processes. 1 g of the swollen layered silicate having kenyaite structure is added to a solution in which 0.2 to 1.5 g of the organic metal compound is dissolved in 10 g of ethanol, stirred at a room temperature for 3 days, and washed twice with ethanol. After added with 30 g of water, the resulting solution is stirred for 6 hours, washed with water, dried and calcined at a high temperature for 1 to 12 hours, to introduce the metal oxide between the layers of the layered silicate having kenyaite structure. Finally, in order to remove a small amount of residual impurities, the resulting product is refluxed with 1M ammonium nitrate aqueous solution at 80° C. for 24 hours, filtered, dried, and calcined in the air at 500° C. for 4 hours.

In addition, the present invention provides a method for preparing ε-caprolactam from cyclohexanone oxime by performing gas phase Beckmann rearrangement of cyclohexanone oxime using the metal oxide-containing kenyaite catalyst.

Preferably, a reaction temperature ranges from 300 to 400° C., and more preferably, from 300 to 350° C. If the reaction temperature does not reach the range, the conversion of cyclohexanone oxime is lowered, and if the reaction temperature exceeds the range, the yield of ε-caprolactam is reduced due to side reactions.

The weight hourly space velocity (WHSV) of cyclohexanone oxime preferably ranges from 0.1 to 15 $h^{-1}$. If the WHSV does not reach the range, reaction efficiency is lowered, and if the WHSV exceeds the range, the lifetime of the catalyst is rapidly shortened. Preferably, exemplary solvents used for the reaction of cyclohexanone oxime include alcohol ($C_2$–$C_8$), benzene, toluene, acetone and acetonitrile.

In an embodiment of the present invention, the Beckmann rearrangement may be performed, as follows:

The metal oxide-containing kenyaite catalyst according to the present invention may be pre-processed by filling the kenyaite catalyst in a quartz tube having a filter, inserting a thermocouple into the catalyst layers to control the temperature to about 500° C., and flowing an inert gas such as helium and nitrogen as a carrier gas. After the pre-process, the reaction temperature may be controlled between 300 and 400° C., and cyclohexanone oxime dissolved in the solvent may be injected into a vaporizer at a constant speed using a syringe pump.

In accordance with the present invention, the metal oxide-containing kenyaite catalyst shows the excellent conversion of cyclohexanone oxime and high yield of ε-caprolactam.

The preferred examples of the present invention will now be explained in more detail, which is not intended to limit the scope of the present invention.

EXAMPLES

Example 1

Preparation I of a Layered Silicate having Kenyaite Structure 0.82 g of NaOH (97 wt %) and 0.31 g of $H_3BO_3$ (99.5 wt %) were dissolved in 71.8 g of distilled water in a polyethylene beaker. After added with 15 g of colloidal silica (Ludox AS 40) and 5.01 g of hexamethyleneimine (99 wt %), the resulting solution was stirred for 12 hours, put in a Teflon reactor, sealed up, and heated at 150° C. for 12 days.

The generated white solid was washed with distilled water a few times, filtered, and dried at 80° C. It was demonstrated from the X-ray diffraction measurement results that the white solid was a pure layered silicate having kenyaite structure. In addition, according to thermal analysis and element analysis results, about 7.2 wt % of hexamethyleneimine and 0.03 wt % of Na and B were contained therein.

Example 2

Preparation II of a Layered Silicate having Kenyaite Structure 1.37 g of NaOH (97 wt %) and 1.04 g of $H_3BO_3$ (99.5 wt %) were dissolved in 119.7 g of distilled water in a polyethylene beaker. After added with 25 g of colloidal silica (Ludox AS 40) and 8.35 g of hexamethyleneimine (99 wt %), the resulting solution was stirred for 12 hours, put in a Teflon reactor, sealed up, and heated at 150° C. for 12 days.

The generated white solid was washed with distilled water a few times, filtered, and dried at 80° C. It was demonstrated from the X-ray diffraction measurement results that the white solid was a pure layered silicate having kenyaite structure. In addition, according to thermal analysis and element analysis results, about 8.7 wt % of hexamethyleneimine and 0.03 wt % of Na and B were contained therein.

Example 3

Preparation of a Swollen Layered Silicate having Kenyaite Structure 5 g of the layered silicate having kenyaite structure prepared in Example 1 was added to a mixed solution of 22.5 g of CTMACl (cetyltrimethylammonium chloride, 25 wt %) and 12.5 g of TPAOH (tetrapropylammonium hydroxide, 1.0 molarity) in a polyethylene vessel, and stirred for 20 minutes to be dispersed. The resulting solution was heated at 100° C. for 4 days, washed with distilled water, and dried.

Example 4

Preparation of a Niobium Oxide-Containing Kenyaite Catalyst

Catalyst A 0.45 g of Nb($C_2H_5O$)$_5$ was dissolved in 10 g of ethanol in a polyethylene vessel. 1 g of the swollen layered-silicate having kenyaite structure prepared in Example 3 was dispersed in the resulting solution. The resulting solution was stirred at room temperature for 3 days, washed twice with ethanol, and filtered. After added with 30 g of distilled water, the resulting solution was stirred for 6 hours, washed with distilled water, centrifuged, dried at 100° C., and calcined in the air at 550° C. for 12 hours. The resulting product was refluxed using 1M ammonium nitrate aqueous solution at 80° C. for 24 hours, washed with distilled water a few times, dried, and fired in the air at 500° C. for 4 hours, to obtain Catalyst A.

According to element analysis and BET surface area measurement results, Catalyst A contained 9.0 wt % of Nb, and the BET surface area of Catalyst A was 172 $m^2/g$.

Example 5

Preparation of a Niobium Oxide-Containing Kenyaite Catalyst

Catalyst B

Catalyst B was prepared in the same manner as that of Example 4, except for using 0.75 g of Nb($C_2H_5O$)$_5$. According to element analysis and BET surface area measurement results, Catalyst B contained 10.3 wt % of Nb, and the BET surface area of Catalyst B was 168 $m^2/g$.

Example 6

Preparation of a Niobium Oxide-Containing Kenyaite Catalyst

Catalyst C

Catalyst C was prepared in the same manner as that of Example 4, except for using 1.37 g of $Nb(C_2H_5O)_5$. According to element analysis and BET surface area measurement results, Catalyst C contained 10.5 wt % of Nb, and the BET surface area of Catalyst C was 237 $m^2/g$.

Example 7

Preparation of a Tantalum Oxide-Containing Kenyaite Catalyst

Catalyst D

Catalyst D was prepared in the same manner as that of Example 4, except for using 0.5 g of $Ta(C_2H_5O)_5$ instead of $Nb(C_2H_5O)_5$. According to element analysis and BET surface area measurement results, Catalyst D contained 5.4 wt % of Ta, and the BET surface area of Catalyst D was 203 $m^2/g$.

Example 8

Preparation of a Tantalum Oxide-Containing Kenyaite Catalyst

Catalyst E

Catalyst E was prepared in the same manner as that of Example 4, except for using 0.7 g of $Ta(C_2H_5O)_5$ instead of $Nb(C_2H_5O)_5$. According to element analysis and BET surface area measurement results, Catalyst E contained 8.8 wt % of Ta, and the BET surface area of Catalyst E was 171 $m^2/g$.

Example 9

Preparation of a Tantalum Oxide-Containing Kenyaite Catalyst

Catalyst F

Catalyst F was prepared in the same manner as that of Example 4, except for using 0.9 g of $Ta(C_2H_5O)_5$ instead of $Nb(C_2H_5O)_5$. According to element analysis and BET surface area measurement results, Catalyst F contained 9.4 wt % of Ta, and the BET surface area of Catalyst F was 189 $m^2/g$.

Comparative Example 1

Preparation of ZSM-5 catalyst

Comparative Catalyst G

ZSM-5 catalyst was synthesized according to a conventional method, to be compared with the metal oxide-containing kenyaite catalyst of the present invention in view of catalytic performance. 1.65 g of NaOH (97 wt %) and 5.43 g of TPABr (tetrapropylammonium bromide, 98 wt %) were dissolved in 125.6 g of distilled water in a Teflon reactor. 12 g of fumed silica was added to the resulting solution, to form a gel. After the gel was stirred for 24 hours, the Teflon reactor was put in a stainless steel vessel, sealed up, and heated at 150° C. in an electric oven for 5 days. The generated white solid was washed with distilled water a few times, filtered, and dried at 100° C. It was demonstrated from the powder X-ray diffraction results that the white solid was ZSM-5, and according to the element analysis results, the Si/Al molar ratio was over 12200.

The synthesized ZSM-5 was processed for catalytic reaction as follows. The ZSM-5 was calcined in the air at 550° C. for 16 hours to remove the template organic amine. The fired ZSM-5 was refluxed using 1M ammonium nitrate aqueous solution at 80° C. for 24 hours, washed with distilled water a few times, filtered, dried at 100° C., and calcined in the air at 500° C. for 4 hours.

Example 10

Beckmann Rearrangement of Cyclohexanone Oxime

The Beckmann rearrangement of cyclohexanone oxime was performed by using Catalysts A, B, C, D, E and F prepared in Examples 4 to 9 and Comparative Catalyst G prepared in Comparative Example 1.

In more detail, 0.3 g of each of these catalysts was filled in a quartz tube having an inside diameter of 8 mm, and preprocessed at 500° C. for 2 hours by flowing helium at 20 cc/min. A temperature was lowered to 350° C., and a solution having a molar ratio of oxime and ethanol as 1:9 (oxime : ethanol) was flowed to the quartz tube. The WHSV of cyclohexanone oxime was 0.8 $h^{-1}$, and the temperature of the catalyst layer was maintained at 350° C. The reaction product was collected in every hour at an ice water temperature and analyzed by gas chromatography having a FID detector. Table 1 shows the reaction results.

TABLE 1

| Catalyst | Reaction time (h) | Conversion of cyclohexanone oxime (wt %) | Yield of ε-caprolactam (wt %) |
|---|---|---|---|
| Catalyst A | 2 | 100 | 92.2 |
|  | 8 | 100 | 92.7 |
| Catalyst B | 2 | 100 | 91.3 |
|  | 8 | 100 | 92.8 |
| Catalyst C | 2 | 100 | 84.9 |
|  | 8 | 92.4 | 81.7 |
| Catalyst D | 2 | 98.9 | 79.6 |
|  | 8 | 98.2 | 84.1 |
| Catalyst E | 2 | 100 | 81.5 |
|  | 8 | 98.9 | 82.7 |
| Catalyst F | 2 | 100 | 82.9 |
|  | 8 | 96.1 | 82.8 |
| Comparative Catalyst G | 2 | 71.6 | 69.3 |
|  | 8 | 65.6 | 63.4 |

As shown in Table 1, metal oxide-containing kenyaite Catalysts A to F of the present invention are much superior to conventional Comparative Catalyst G which does not contain a metal oxide in the conversion of cyclohexanone oxime and the yield of ε-caprolactam.

The metal oxide containing kenyaite catalyst of the present invention can replace the sulfuric acid catalyst conventionally used in preparation of ε-caprolactam, thereby avoiding environmental contamination, safety problems and by-product generation. In addition, the catalyst can improve the conversion of cyclohexaone oxime and the yield of ε-caprolactam in the Beckmann rearrangement of cyclohexanone oxime, and thereby, high-quality ε-caprolactam can be economically and efficiently prepared from cyclohexanone oxime by using the catalyst.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A metal oxide-containing kenyaite catalyst for producing ε-caprolactam, which is prepared by introducing a metal oxide between layers of a layered silicate having kenyaite structure containing amine template, and which has a BET surface area of 100 to 300 $m^2/g$ and weak or medium acid site,
   wherein the content of the metal oxide ranges from 1 to 15 wt % of the total catalyst weight on the basis of the metal weight in the metal oxide.

2. The catalyst of claim 1, wherein the metal oxide is selected from the group consisting of $Nb_2O_5$, $Ta_2O_5$, $Mo_2O_3$, $MoO_3$ and $WO_3$.

3. A method for preparing a kenyaite catalyst according to claim 1, comprising the steps of:
   synthesizing a layered silicate having kenyaite structure containing an amine template by using $SiO_2$, $Na_2O$, $H_2O$, boric acid and amine template;
   swelling the synthesized layered silicate having kenyaite structure containing an amine template; and
   adding an organic metal compound to the swollen layered silicate having kenyaite structure at an amount of 1 to 15 wt % of the total catalyst weight on the basis of the metal weight in the metal oxide to introduce a metal oxide between the layers of the layered silicate.

4. The method of claim 3, wherein the layered silicate having kenyaite structure containing an amine template is prepared in the presence of 0.5 to 1.5 mol of an amine template on the basis of 2.0 mol of $SiO_2$.

5. The method of claim 3, wherein the layered silicate having kenyaite structure containing an amine template is prepared by further adding 0.01 to 0.3 mol of boric acid on the basis of 2 mol of $SiO_2$.

6. The method of claim 3, which uses a mixed solution wherein the amine selected from amines having 6 to 16 carbon atoms is mixed with TPAOH (tetrapropylammonium hydroxide) as the swelling agent.

7. The method of claim 3, wherein a metal oxide selected from the group consisting of $Nb_2O_5$, $Ta_2O_5$, $Mo_2O_3$, $MoO_3$ and $WO_3$ is introduced between the layers of the layered silicate having kenyaite structure, by adding one selected from the group consisting of $Nb(C_2H_5O)_5$, $Ta(C_2H_5O)_5$, $Ta[O(CH_2)_3CH_3]_5$, $[(CH_3CO_2)_2Mo]_2$, $Mo(CO)_6$ and $W(CO)_6$ as the organic metal compound.

8. The method of claim 3, wherein after the organic metal compound is added, the resulting product was fired at 500 to 900° C.

9. A method for preparing ε-caprolactam, which performs gas phase Beckmann rearrangement of cyclohexanone oxime, by using the metal oxide-containing kenyaite catalyst according to claim 1, and a solvent selected from the group consisting of alcohol ($C_2$–$C_8$), benzene, toluene, acetone and acetonitrile, at a weight hourly space velocity of cyclohexanone oxime between 0.1 to 15 $h^{-1}$ and at a reaction temperature of 300 to 400° C.

* * * * *